United States Patent [19]
Divone, Sr. et al.

[11] Patent Number: 5,312,240
[45] Date of Patent: May 17, 1994

[54] APPARATUS FOR FORMING A COSMETIC STICK

[75] Inventors: Peter A. Divone, Sr., New City, N.Y.; Angelo C. Piro, Jr., Swedesboro, N.J.; Jesus A. Urbaez, Waterbury, Conn.

[73] Assignee: Chesebrough-Pond's USA Co., Division of Conopco, Inc., Greenwich, Conn.

[21] Appl. No.: 50,923

[22] Filed: Apr. 21, 1993

Related U.S. Application Data

[62] Division of Ser. No. 803,265, Dec. 5, 1991, Pat. No. 5,229,059.

[51] Int. Cl.⁵ .................... B29C 39/06; B29C 59/00
[52] U.S. Cl. .................... 425/385; 53/122; 53/440; 53/471; 264/293; 264/296; 264/322; 425/392; 425/403; 425/403.1
[58] Field of Search .............. 425/384, 385, 392, 403, 425/403.1, DIG. 32, 386; 264/267, 296, 320, 279, 268, 293, 322; 53/122, 113, 114, 428, 440, 471; 401/174, 175; 85/862

[56] References Cited

U.S. PATENT DOCUMENTS

| | | | |
|---|---|---|---|
| 2,879,548 | 3/1959 | Croce et al. | 53/122 |
| 4,369,158 | 1/1983 | Woodruff et al. | 264/268 |
| 4,545,696 | 10/1985 | Carluccio | 401/175 |
| 4,552,161 | 11/1985 | Hill et al. | 401/175 |
| 4,595,124 | 6/1986 | Duval et al. | 401/174 |
| 4,605,330 | 8/1986 | Crowley et al. | 401/175 |
| 4,841,826 | 6/1989 | Smith | 83/862 |
| 4,899,977 | 2/1990 | Hempel | 425/DIG. 32 |
| 4,915,528 | 4/1990 | Seager | 401/175 |

Primary Examiner—Jay H. Woo
Assistant Examiner—Joseph Leyson
Attorney, Agent, or Firm—Milton L. Honig

[57] ABSTRACT

An apparatus is reported for shaping an end of a solid cosmetic stick such as a deodorant or antiperspirant. The apparatus operates through a method that includes the steps of filling a package body with a molten cosmetic composition, solidifying the composition into stick form, heating a mold or package cap, elevating the stick to extend the package body opening, and contacting an end portion of the stick with the heated die or cap. A pattern such as a trademark or logo may be molded through this process onto the end portion of the stick.

2 Claims, 3 Drawing Sheets

APPARATUS FOR FORMING A COSMETIC STICK

CROSS REFERENCE

This is a divisional application of Ser. No. 07/803,265, filed Dec. 5, 1991, which matured into U.S. Pat. No. 5,229,059.

BACKGROUND OF THE INVENTION

1. Field of the Invention

The invention concerns an apparatus for shaping an exposed end of a relatively low-melting cosmetic stick.

2. The Related Art

Deodorants, antiperspirants and lipsticks have the common characteristic of being composed of a solid low-melting waxy material encased in a suitable container provided with a means for urging the stick upwards through the container to expose more surface area as the stick is consumed. Deodorant and antiperspirant compositions generally have been fabricated by pouring the composition in molten state into the suitable container equipped with a twist-up device.

Top filling of the containers has been described in a number of patents including U.S. Pat. No. 2,818,167 (McKinley), U.S. Pat. No. 2,980,246 (Leshin), U.S. Pat. No. 3,907,441 (Idec), U.S. Pat. No. 4,232,977 (Chutter), U.S. Pat. No. 4,363,560 (Gentile), U.S. Pat. No. 4,521,127 (Tomburo et al) and U.S. Pat. No. 4,580,920 (Schmidt).

More recently, advantages have been shown with a bottom-filling technique. After filling is completed, but before solidification of the material to be dispensed, the twist-up mechanism is installed. Examples of this technology include U.S. Pat. No. 4,552,161 (Hill et al), U.S. Pat. No. 4,595,124 (Duval et al), U.S. Pat. No. 4,621,935 (Sussman), U.S. Pat. No. 4,664,547 (Rosenwinkle), U.S. Pat. No. 4,700,448 (Parker) and U.S. Pat. No. 4,702,399 (Davis). Filling solid stick dispensers before they are completely assembled and then subsequently completing assembly has been reported in U.S. Pat. No. 4,298,036 (Horvath), U.S. Pat. No. 4,545,696 (Carluccio), U.S. Pat. No. 4,605,330 (Crowley et al) and U.S. Pat. No. 4,915,528 (Seager).

A general problem with all the foregoing methods is need for a means to achieve a particular shape for the exposed end portion of the stick. Two techniques to accomplish the stick end shaping are mechanical trimming and molding procedures. Typical of mechanical trimming is EP 0 335 112 (Karavadra) wherein a solid antiperspirant stick is sculpted with a set of heated cutting edges. A precut cutting edge is oscillated in one direction to partially cut into one side of the exposed end of the stick. Rough cut and finish cut cutting edges are then arcuately passed through the end of the stick in the opposite direction. U.S. Pat. No. 4,841,826 (Smith) trims by notching a deodorant bar on one side and a rough cutter moves inwardly through the other side of the body to enter the closed end of the notch and sever body material without breaking. Thereafter a finish cutter removes relatively little material to produce a finish cut.

Mechanical trimming has a major drawback in that there is significant material loss. There is also constraint on flexibility in the trim shape. Designs such as product trademark logos are quite difficult, if not impossible, to achieve with a trimming process. Finally, there is the detriment of low speed. Several trimming machines are, therefore, necessary if high unit volume is to be achieved.

Molding techniques have certain advantages over trimming. U.S. Pat. No. 4,369,158 (Woodruff et al) describes a process wherein a pouring cup is attached to the top of the container in a removable manner. Molten antiperspirant composition is injected through the bottom of the container. A twist-up device having air vents is then inserted into the still molten composition. Once cooled, the pouring cap, operating as a mold to achieve a domed shape on the exposed stick end, is thereafter removed. Among the problems of this method is the necessity for maintaining a molten state after the dome formation to accommodate insertion of the twist-up device. Additional costs are incurred because of this hot insertion. Production line speeds are also adversely impacted by the need to maintain the molten state for insertion of the twist-up device.

Accordingly, it is an object of the present invention to provide an apparatus for manufacturing a cosmetic stick which avoids loss of any material during shaping.

It is another object of the present invention to provide an apparatus for manufacturing a cosmetic stick of domed structure which allows for high speed shaping.

It is still another object of the present invention to provide an apparatus for manufacturing a cosmetic stick which allows embossing of a design or logo onto an end thereof.

It is a further object of the present invention to obtain a cosmetic stick operative as a deodorant or antiperspirant and being provided through the apparatus with a domed appearance with highly defined features.

A still further object of the present invention is to avoid use of a pouring cap necessary in previous molding processes and through its elimination avoid costs and drawbacks of this additional packaging component.

These and other objects of the present invention will become more readily apparent through consideration of the embodiments that follows.

SUMMARY OF THE INVENTION

An apparatus for shaping an end of a solid cosmetic stick is provided which operates through a process comprising the steps of:

(i) filling a package body with a molten cosmetic composition;

(ii) solidifying the molten cosmetic composition within the package body to form the cosmetic stick;

(iii) heating a means for molding an end of the solidified cosmetic stick;

(iv) elevating the solidified cosmetic stick above an open terminal end of the package body to expose an end portion of the stick; and (v) contacting the end portion of the cosmetic stick with the heated molding means thereby shaping the cosmetic stick end portion into a selected shape.

Molding may be accomplished through use of either a die or a package cap. A trademark, design or other logo may through the heating step be embossed onto the cosmetic composition stick. Use of the die molding route is preferred where embossing is sought.

The invention is particularly directed toward deodorant and antiperspirant sticks wherein the process is conducted to achieve a sharply defined domed structure at a protruding end thereof.

An apparatus for shaping an end of a solid cosmetic stick is also provided comprising:

(i) a means for transporting a package body having a cavity for receiving a solid cosmetic stick, the cavity extending in a direction defined by a longitudinal axis and having an open terminal end, the body including a means for moving the cosmetic stick along the longitudinal axis;

(ii) a heated means for molding an end of the solid cosmetic stick;

(iii) a means for positioning the heated molding means to contact the package body, (iv) a means for actuating the moving means to elevate the solid cosmetic stick above the open terminal end of the package body to expose an end of the stick and so as to allow contact between the stick end and the heated molding means for purposes of shaping the stick end; and (v) a means for transporting the package body with the molded stick end away from the heated molding means.

BRIEF DESCRIPTION OF THE DRAWING

The above-noted features and objects of the present invention will become more apparent as the following description proceeds and in view of the accompanying drawing, by way of example only, wherein.

DETAILED DESCRIPTION OF THE INVENTION

Now it has been discovered that cosmetic stick ends can be shaped through molding without involvement of a fully molten stick. Hitherto shaping of ends occurred simultaneously with the cosmetic stick in a molten state being poured into its package. Top-filling of the package was not an option with this prior art method. Only bottom-filling could be employed. With the apparatus of the present invention a package including all internal mechanisms such as a propel/repel knurled-screw device may be filled with molten cosmetic composition and solidified therein. Formation of a dome or other shape for the end of the stick is now conducted in a subsequent step. Excellent definition of features is thereby achieved, pouring caps are avoided and high speed production results. Additionally, the system allows for quick changeover between different package/product sizes. Any shape or design can also now be imprinted on a surface of the stick end.

Generally the apparatus of the invention involves shaping an end of a cosmetic stick through the steps of:

(i) filling a package body with a molten cosmetic composition;

(ii) solidifying the composition within the package body to form the cosmetic stick;

(iii) heating a package cap or die for molding an end of the solidified cosmetic stick;

(iv) elevating the solidified cosmetic stick above an open terminal end of the package body to expose a portion of the stick; and (v) contacting the end portion of the cosmetic stick with the heated die or package cap thereby shaping the cosmetic stick end portion into a selected shape.

Figure 1:
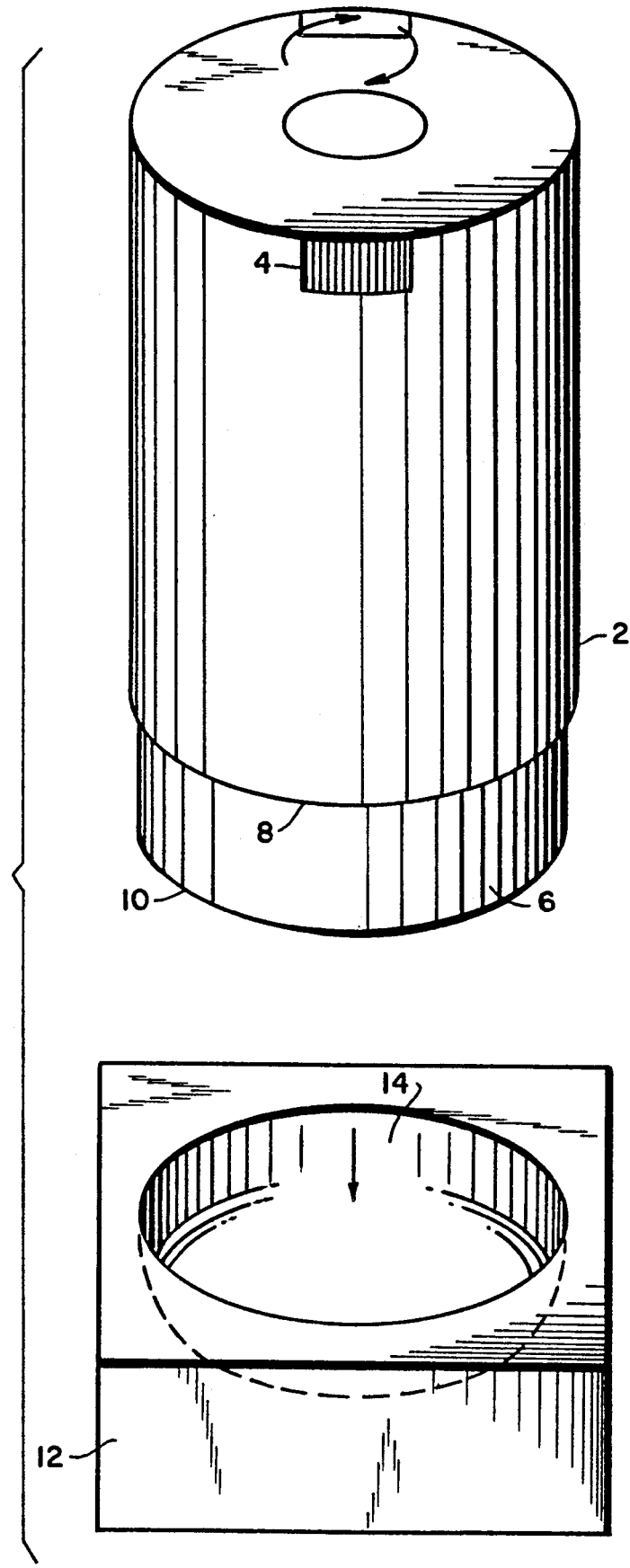
FIG. 1 illustrates a package body having a cosmetic composition in stick form protruding therefrom and being positioned for contact with a heated die.

FIG. 1 illustrates the contacting step wherein a heated die is employed. A package body 2 fitted with a knurl-screw mechanism 4 is filled with a cosmetic composition that is allowed to solidify into the form of stick 6 Normally the cosmetic composition is allowed to solidify in package body 2 below an open terminal end 8 of the package body. Once stick 6 has been solidified, the package body 2 is inverted. Screw knurl 4 is then turned to extend stick 6 upward past the open terminal end 8. Anywhere from 0.25 inches to 3 inches beyond open terminal end 8 (top of package body), preferably about 0.5 inches, is a suitable extension length.

A heated die 12 formed with a mold cavity 14 is then brought into contact with end portion 10 of the solidified cosmetic stick. Contact must continue for a length of time sufficient to impress a shape defined by mold cavity 14 onto end portion 10 but insufficient time to allow for melting the remaining parts of the stick. Thereafter, die 12 is separated from contact with stick 6 and the latter allowed to cool. Subsequently package body 2 may be sealed with a cap.

Figure 2:
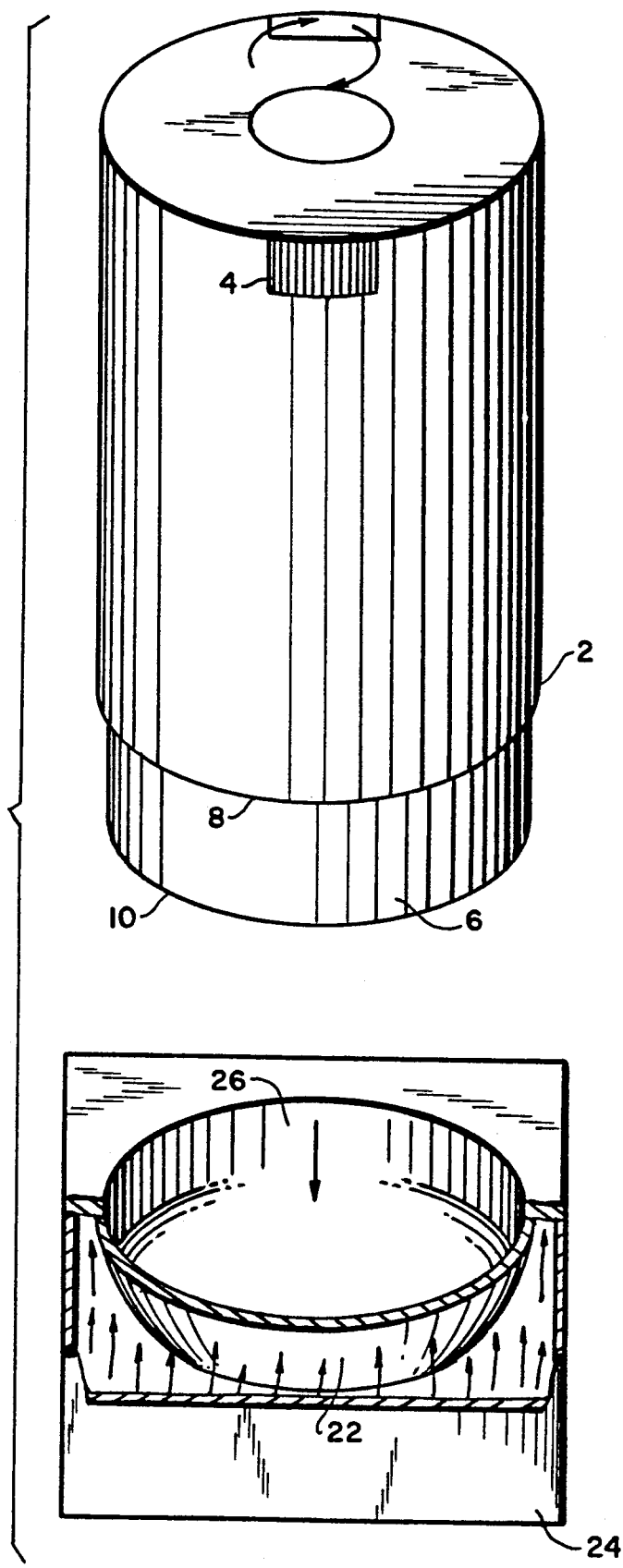
FIG. 2 illustrates a package body having a cosmetic composition in stick form protruding therefrom and being positioned contact with a heated package cap.

FIG. 2 is similar to FIG. 1 but illustrates replacement of the heated die 12 with a heated cap 22 which may serve a dual function as mold cavity and package cap. In this modification of the process, package body 2 is as usual filled with molten cosmetic composition and cooled. As before, the package body is inverted and the screw knurl 4 is turned to extend stick 6 outward beyond the open terminal end 8. Cap 22 as replacement for the heated die 12 cap is first heated, for instance through heat lamps 24. Exposed end portion 10 of stick 6 is then pressed into cap 22, the latter having a shape 26 consonant with the desired mold to be impressed onto the stick end portion. Thereafter, the stick filled cap 22 is cooled in a waterbath to re-solidify the molten stick end portion. Screw-knurl 4 may then be turned to retract product back into the package body with cap 22 remaining attached thereto.

Figure 3:
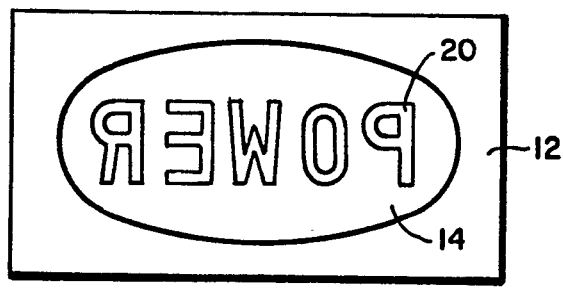
FIG. 3 is a top view of the heated die of FIG. 1 herein illustrating a logo to be embossed into the cosmetic stick.

FIG. 3 illustrates a further feature of the invention. Through this top view of die 12 there can be seen a logo 20 cut into mold cavity 14. Logo 20 can either be formed of raised or lowered lettering thereby imparting a raised or embossed logo onto the cosmetic stick.

Figure 4:
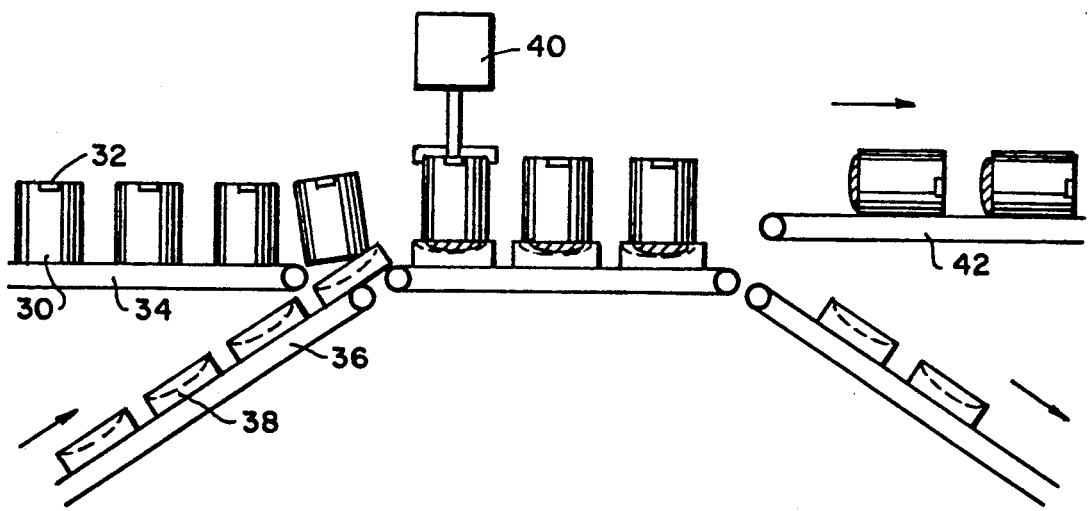
FIG. 4 is a highly schematic diagram of an apparatus specially designed for implementing the process of the present invention.

FIG. 4 presents a schematic view of apparatus specifically designed to conduct the process of this invention. A series of package bodies 30 each fitted with a propel/repel knurled-screw mechanism 32 are transported along a conveyor belt 34. Each of the package bodies 30 contain a solid cosmetic stick held in a retracted position within the package body. Another conveyor belt 36 carries a series of heated molds 38 to a rendezvous point to contact a respective package body 30 whereupon the package body is positioned atop the heated mold. Instead of a die or mold 38, there may be substituted a cap which may serve the dual purpose of shaping the stick end through heating and of becoming a part of protective wrapping around the cosmetic stick.

A stick actuation device 40 is positioned downstream from the rendezvous point of package body with mold. Actuation device 40 functions to turn the knurled-screw sufficiently to cause the solid cosmetic stick to be elevated above the open terminal end of the package body thereby exposing the stick end to contact with the heated mold, die or cap. Thereafter the package body with the molded stick end is separated from the mold and transported away by conveyor belt 42.

Cosmetic compositions of the present invention are preferably deodorants or antiperspirants but may also include lipsticks. Softening points of the cosmetic compositions may range anywhere from about 20° to about 90° C., preferably from about 30° to 50° C. Deodorants normally contain from about 10 to about 80% of a polyhydric alcohol, from about 0.1 to about 20% of an alkoxylated nonionic surfactant and, as active component, from about 0.05 to about 10% of an antibacterial agent which may be trichlosan or trichloban. Antiperspirant compositions are normally characterized by including from about 5 to about 40% of a fatty alcohol, from about 1 to about 60% of a silicone and, as active ingredient, from about 1 to about 40% of an astringent salt. Typical astringent salts include aluminum and zirconium salts such as aluminum chlorhydrate and aluminum/zirconium chlorhydrate glycine complex.

Although the invention has been described in detail for the purpose of illustration, it is to be understood that such detail is solely for that purpose and variations can be made therein by those skilled in the art without departing from the spirit and scope of the invention which is defined by the following claims.

What is claimed is:

1. An apparatus for shaping an end of a solid cosmetic stick comprising:
   (i) means for transporting a package body having a cavity for receiving a solid cosmetic stick, the cavity extending in a direction defined by a longitudinal axis and having an open terminal end, the body including a means for moving the cosmetic stick along the longitudinal axis;
   (ii) a heated means for molding an end of the solidified cosmetic stick, the heated means being a heated cap having a mold cavity defining a selected shape and which remains with the package body as a cap therefor after cooling of the stick;
   (iii) means for positioning the heated molding means to contact the package body;
   (iv) a means for actuating the moving means to elevate the solidified cosmetic stick above the open terminal end of the package body to expose the stick and so as to allow contact between the stick and the heated molding means for purposes of shaping the stick; and
   (v) a means for transporting the package body with the molded stick end away from the means for positioning the heated molding means.

2. An apparatus for shaping an end of a solid cosmetic stick comprising:
   (i) means for transporting a package body having a cavity for receiving a solid cosmetic stick, the cavity extending in a direction defined by a longitudinal axis and having an open terminal end, the body including a means for moving the cosmetic stick along the longitudinal axis;
   (ii) a heated means for molding an end of the solidified cosmetic stick, the heated means being a heated die having a mold cavity defining a selected shape;
   (iii) a means for positioning the heater molding means to contact the package body;
   (iv) a means for actuating the moving means to elevate the solidified cosmetic stick above the open terminal end of the package body to expose the stick and so as to allow contact between the stick and the heated molding means for purposes of shaping the stock; and
   (v) a means for transporting the package body with the molded stick end away from the heated molding means.

* * * * *